United States Patent [19]
Meyer et al.

[11] 3,755,999

[45] Sept. 4, 1973

[54] PIVOTED BLADE ASSEMBLIES FOR ROTARY MOWERS

[75] Inventors: Dolph Allan Meyer, Turramurra; Edward Henry Sykes, Greenacre, New South Wales, both of Australia

[73] Assignee: Victa Limited, Milperra, New South Wales, Australia

[22] Filed: Sept. 26, 1972

[21] Appl. No.: 292,357

[30]  Foreign Application Priority Data
Sept. 28, 1971 Australia.................................. 6459

[52] U.S. Cl. ................................................ 56/295
[51] Int. Cl............................................ A01d 55/18
[58] Field of Search ....................................... 56/295

[56]  References Cited
UNITED STATES PATENTS
3,203,161   8/1965   Breisch et al......................... 56/295
3,540,198   11/1970   Heth et al............................. 56/295

*Primary Examiner*—Louis G. Mancene
*Attorney*—S. Delvalle Goldsmith et al.

[57]  ABSTRACT

A blade holder, for a rotary scythe-type lawnmower, which is constructed as a circular plate formed as an upright truncated cone with a flat top and a flanged base, and wherein a diametral portion is depressed across the cone and has a medial part for mounting of the blade holder to a drive shaft from the lawnmower, and end portions containing mounts for pivotable cutting blades.

8 Claims, 8 Drawing Figures

PATENTED SEP 4 1973 3,755,999

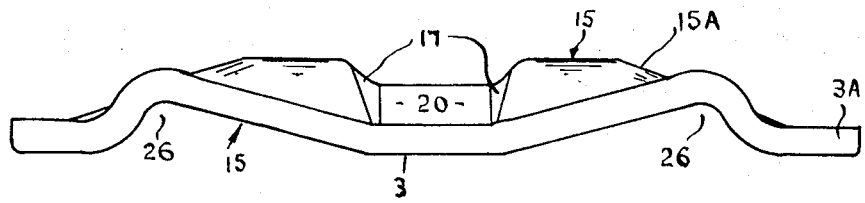
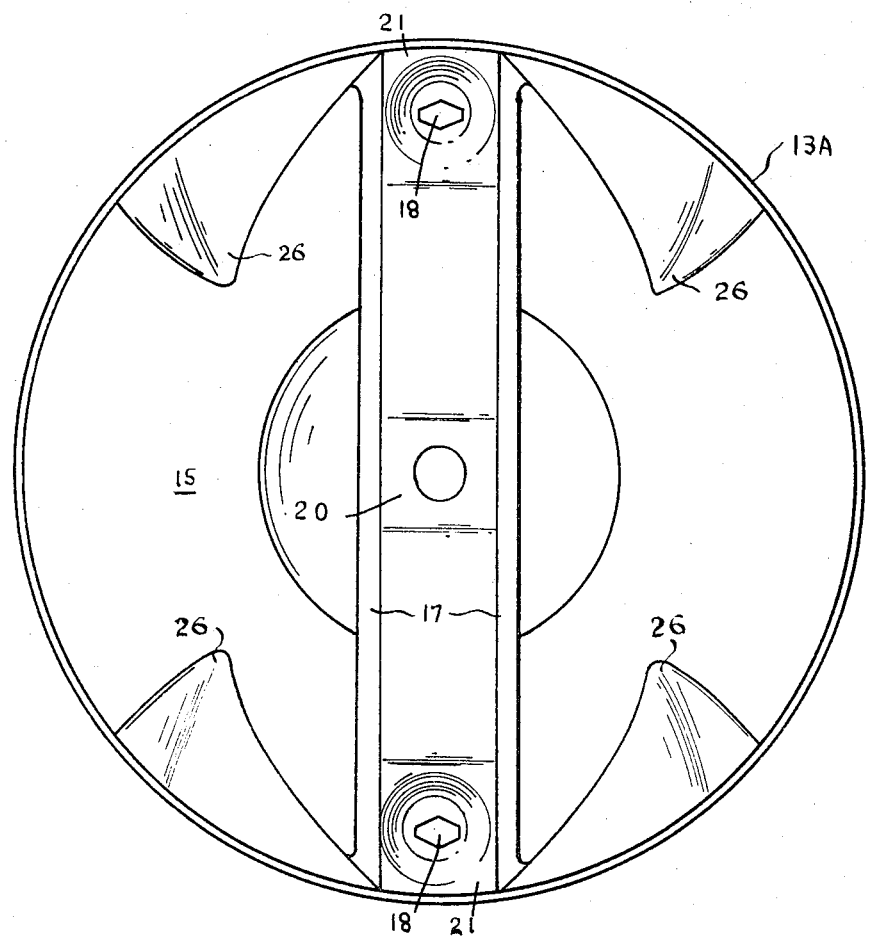

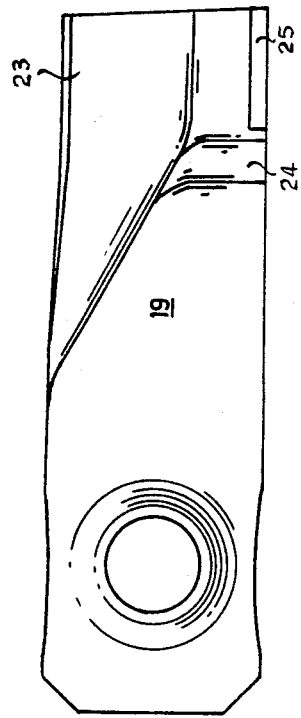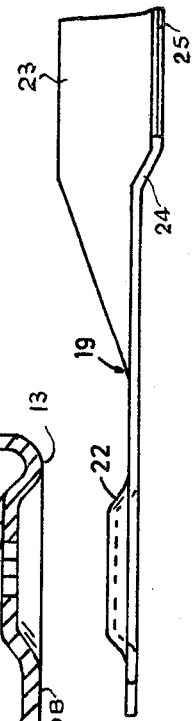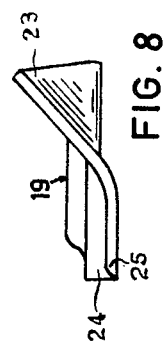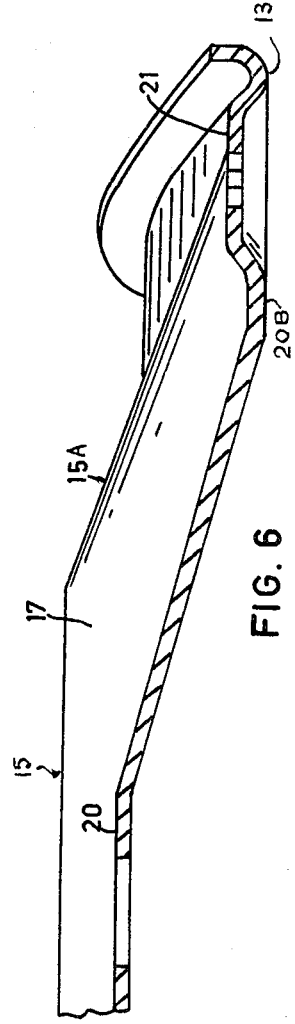

PIVOTED BLADE ASSEMBLIES FOR ROTARY MOWERS

This invention relates to the assemblies utilized in rotary scythe-type lawnmowers which incorporate cutting blades rotatably mounted upon a blade holder which in turn is bolted to the end of the drive shaft from the lawnmower power unit.

In the use of such assemblies many earlier attempts have been made to overcome undesirable effects upon these assemblies resulting from the straightening action of centrifugal forces generated by their rotation during operation of the lawnmower. An important requirement is that the cutting edges of the blades operate in a plane beneath the remainder of the assembly in order, among other things, to avoid wear and damage thereto by contact with the grass and ground. As a means of achieving this requirement cutting blades have either been downwardly stepped or downwardly inclined from their mounts towards their cutting edges while the blade holders have been produced of upright conical form with the drive shaft connected to the apex thereof.

However, due to the fast rate of rotation of these assemblies these provisions have not been entirely satisfactory due to the centrifugal force's straightening and flattening effect both on the blades as well as on the conical shape of the blade holders. Furthermore, the flexing and relaxing of the assembly from changes in these forces resulting from alteration in the speed of the power unit, particularly when the lawnmower is stationary, has resulted in excessive depth of cut of the grass in places, even to the point of scorching of the grass roots.

It is the principal object of this invention to provide a blade mounting assembly which at least partially avoids these defects.

In one general form the invention provides a cutting blade mounting assembly for fixture on a drive shaft of a rotary scythe-type lawnmower, comprising a circular blade holder of inverted dish-shape having an upright conical body wall connecting a medial flat-topped portion with the periphery of the circular blade holder, a diametral depressed portion extending across the blade holder, and having a medial part depressed from said flat-topped portion and providing means for fixture to said drive shaft, and mounting means on opposite end sections of the diametral depressed portion providing rotatable mounting for respective cutting blades.

The invention will now be described with reference to two preferred embodiments shown by the accompanying drawings in which:

FIG. 4 is a plan view of a second form of blade holder;

FIG. 5 is a side elevation of the blade holder shown in FIG. 4;

FIG. 6 is an enlarged fragmentary side view in section of the blade holder shown in FIGS. 4 and 5 with a second form of blade displaced from its mounting position;

FIG. 7 is a plan view of the blade shown in FIG. 6; and,

FIG. 8 is an end elevation of the blade shown in FIGS. 6 and 7.

Figure 1:
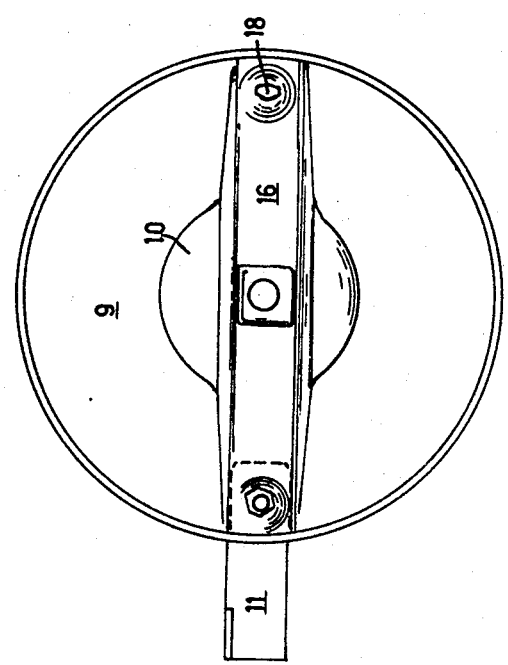
FIG. 1 is a plan view of a first form of blade holder with its associated blade secured thereto.
Figure 3:
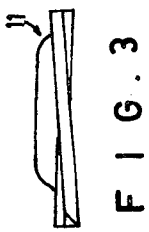
FIG. 3 is an end elevation of the blade shown in FIGS. 1 and 2.
Figure 2:
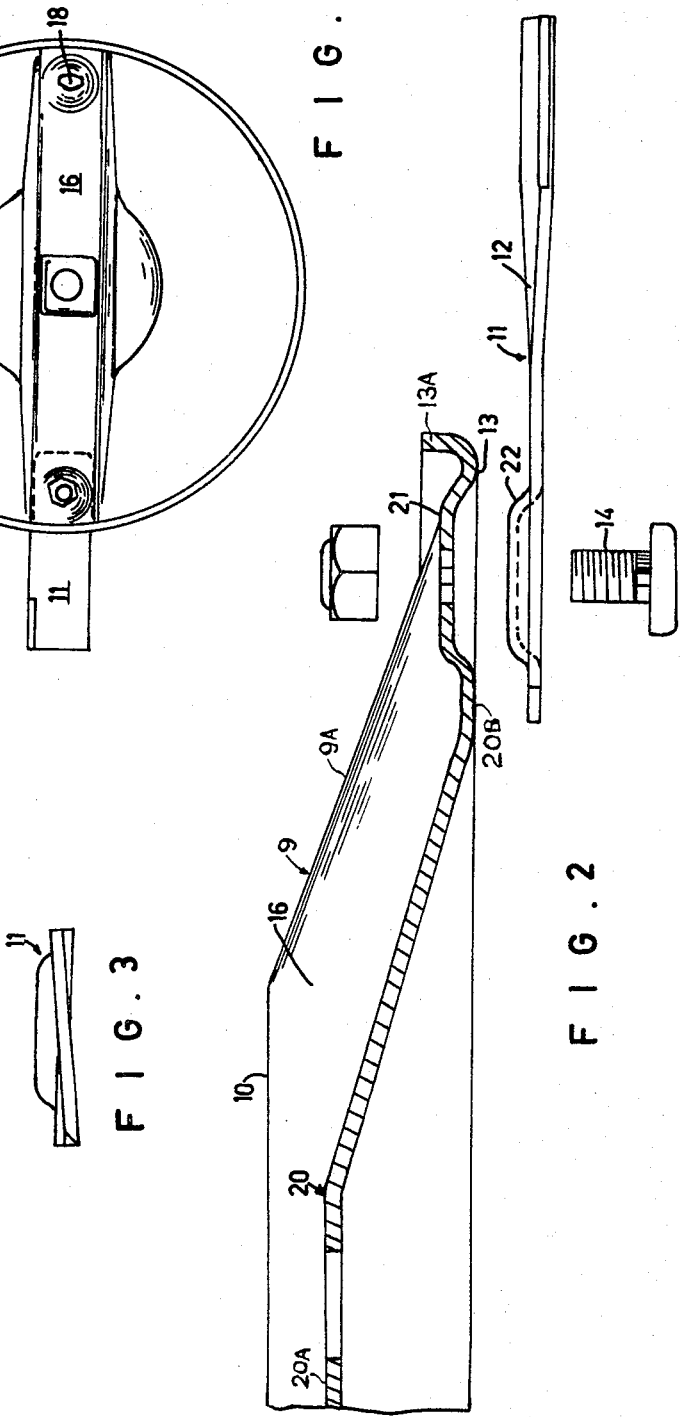
FIG. 2 is an enlarged fragmentary side view in section of the blade holder shown in FIG. 1 with the associated blade displaced from its mounting position.

With reference to FIGS. 1 to 3 a blade holder 9 of inverted dish-shaped form has an upright conical body wall 9A with a flattened plateau 10 at its peak. The base of the conical wall 9A is bent upwardly at 13 to form a peripheral upright flange 13A for reinforcement of the periphery of the blade holder 9. The underside of the bend 13 is in the same plane throughout the periphery of the blade holder. Diametrally across the upper face of the blade holder 9 a substantially rectangular beam-like portion 20 of the conical blade holder 9 is depressed to provide a central substantially flat mounting platform 20A apertured to accept the lower end (not shown) of the drive shaft of a power unit for the lawnmower and which is at a level beneath that of the plateau 10. Preferably, the material of the blade holder 9 is stepped downwardly at 16 from the conical wall 9A at an inclined angle to avoid weakening right-angular bends. The depressed portion 20 to either side of the platform 20A is inclined somewhat less than the angle of inclination of the conical wall 9A whereby opposite terminal ends 20B of the portion 20 extend radially for a distance to join the bend 13 and to be coplanar with its underside. An upward circular impression 21 is formed in each terminal end 20B. A multi-sided mounting hole 18 for a cutting blade is provided in each impression 21.

In the design of a blade holder 9 of the above type the spacing between the planes of the terminal ends 20B and the platform 20A of the portion 20 will conform to the requirements normally attendant a blade holder for a specific lawnmower dependent to a large extent upon the length of the drive shaft. Hitherto the conical angle of the wall of the dished holder has been dictated by the spacing of the above mentioned planes. By this invention the conical angle of most of the wall of the blade holder 9 is increased considerably from that which would be normally possible, with corresponding greater resistance to flattening of the cone as the result of centrifugal forces.

The embodiment shown by FIGS. 1 to 3 is intended to be used with a cutting blade 11 which is substantially flat and slightly twisted as at 12 to improve cutting and to reduce grass drag. This blade does not have an upswept trailing edge as it is of the kind designed for use without a grass catcher on the lawnmower, and, therefore, requiring less air turbulence beneath the baseplate. The blade 11 will often rotate on its mount during operation whether or not it strikes an obstruction, thus conforming with the normal functioning of cutting blades, and is permitted to foul slightly the bend 13. It is, however, permitted to retract from the path of the obstruction to reduce its impact therewith. This will avoid the danger of creating a hazard of high velocity projectiles. The blade 11 at its root end portion is upwardly impressed to form a mounting contour 22 for accommodation within the impression 21. The head of the bolt 14, will, in turn, be accommodated within the contour 22 and will be shielded from wear by the body of the blade 11. The peripheral bend 13 on the blade holder 9 will bear upon the upper surface of the blade 11 to support it against flexing and lifting from centrifugal force. As explained above, the increased conical angle of the wall 9A which extends over almost all of the body of the blade holder 9 also functions to resist elevation of the bend 13, and consequently the blade, even in conditions of extreme centrifugal forces.

The embodiment shown in FIGS. 4 to 8 incorporates a similar diametral, rectangular beam-like portion 20 depressed from a conical wall 15 and connected therewith by an inclined step 17. An impression 21 is provided in each terminal end 20B of the diametral portion 20 to receive the mounting contour 22 of a cutting blade 19 of a kind suitable for use with lawnmowers incorporating grasscatchers. The blade 19, for this purpose, is provided with an upswept trailing edge portion 23 on a body that is substantially flat for mounting in a horizontal plane. As revealed in FIGS. 6 and 8 the outer end portion of the blade 19 is twisted slightly to provide a downward step 24 from its leading edge and extending part way across the blade so that the leading edge near its outer extremity is provided with a cutting edge 25 beneath the level of the body of the blade 19. A cutting blade constructed in this way has a centre of gravity approximately in the same plane as the bend 13 and consequently will not flex to any marked degree under the influence of centrifugal forces. Furthermore, due to the above described construction of the blade holder 9 the plane of the bend 13 itself will not rise to any marked degree under centrifugal forces and thus a blade cutting assembly results which is substantially rigid under operating conditions without the requirement for the use of heavier gauge metal or other provisions which would lead to a substantial increase in the weight of the assembly.

However, where cutting blades of this latter type are employed the upswept edge 23 would foul the bend 13 and flange 13A of the blade holder 9, shown in FIGS. 1 and 2, and prevent the blade 19 from retracting upon impact with an obstruction on the lawn, thereby resulting in the danger of creating a projectile ejected from beneath the lawnmower. To avoid this effect the peripheral edge of the blade holder 15 defined by the bend 13 is upwardly curved or arched to either side of each terminal end 20B of the diametral portion 20 to provide a clearance passageway 26 beneath the peripheral edge for the upswept edge 23 of the blade 19 to pass in a full circle about its securing mount in the impression 21. The conical wall 15A of the blade holder 15 is formed to blend to the curved peripheral edge to complete the passageway 26. As a result the blade 19 will completely retract upon striking an obstacle, or during fluctuation in rotating speed of the blade holder 15, thus largely avoiding creation of the above mentioned hazard to bystanders, as well as avoiding wear and damage by impact of the upswept edge 23 with the periphery of the blade holder 15.

Two exemplary forms of pivoted blade assemblies for lawnmowers have been described in the foregoing passages but it is to be understood that other forms as well as modifications thereto are feasible within the scope of this invention. It should be understood that throughout this specification where terms such as "depressed," "upright," "upper" and "underside" are used which relate to the disposition of the equipment, it is to be assumed that the equipment is located in its normal operating position.

What we claim is:

1. A cutting blade mounting assembly for fixture on a drive shaft of a rotary scythe-type lawnmower, comprising a circular blade holder of inverted dish-shape having an upright conical body wall connecting a medial flat-topped portion with the periphery of the circular blade holder, a diametral depressed portion extending across the blade holder, and having a medial part depressed from said flat-topped portion and providing means for fixture to said drive shaft, and mounting means on opposite end sections of the diametral depressed portion providing rotatable mounting for respective cutting blades.

2. An assembly according to claim 1, wherein the mounting means for each cutting blade is an underside circular recess formed as an impression in an end section of the diametral depressed portion.

3. An assembly according to claim 2, wherein a corresponding circular impression is provided in the mounting end of the cutting blade for rotatable accommodation within the circular recess, a fixing bolt for the cutting blade passing through the recess and the blade impression with its head at least partly concealed within the blade impression.

4. An assembly according to claim 1, wherein the diametral depressed portion has arms at opposite sides of its said medial part which are inclined downwardly at an angle less than the conical angle of said conical body wall.

5. An assembly according to claim 1, wherein the cutting blades each have an upswept trailing edge, and the periphery of the blade holder adjacent the cutting blade mounting means is arched to permit passage of the blade beneath the blade holder.

6. A blade holder for the cutting blades of a rotary scythe-type lawnmower, and fixable to a drive shaft of said lawnmower, comprising a circular plate formed as an upright cone with a flattened top, a peripheral flange formed around the base of the conical plate, a diametral depressed portion in the cone and extending across the conical plate, and having a medial part depressed from said flattened top and providing means for fixture to said drive shaft, and opposite end sections on said diametral depressed portion provided with means for rotatably mounting respective cutting blades.

7. An assembly according to claim 6, wherein the diametral depressed portion has arms at opposite sides of its said medial part which are inclined downwardly at an angle less than the conical angle of said conical body wall.

8. An assembly according to claim 7, wherein the cutting blades each have an upswept trailing edge, and the periphery of the blade holder adjacent the cutting blade mounting means is arched to permit passage of the blade beneath the blade holder.

* * * * *